United States Patent [19]
Carlson

[11] 3,987,294
[45] Oct. 19, 1976

[54] ILLUMINATED GASOLINE TANK

[76] Inventor: Marc W. Carlson, 2610 Garfield Ave. S., No. 101, Minneapolis, Minn. 55408

[22] Filed: Sept. 26, 1975

[21] Appl. No.: 617,094

[52] U.S. Cl. .............................. 240/2 LC; 73/293; 116/118 R; 280/5 A
[51] Int. Cl.² ................. F21V 33/00; G01F 23/00; B60P 3/22
[58] Field of Search ............... 240/2 LC, 2 R; 116/118 R; 73/293; 280/5 A, 5 H

[56] References Cited
UNITED STATES PATENTS

| | | | |
|---|---|---|---|
| 1,264,143 | 4/1918 | Bennett | 73/293 |
| 1,843,512 | 2/1932 | Hutchison | 240/2 LC |
| 2,139,148 | 12/1938 | Brouse | 240/2 LC |
| 2,374,142 | 4/1945 | Steven | 73/334 |
| 2,532,181 | 11/1950 | Moore | 240/2 LC |
| 2,611,856 | 9/1952 | Fredin | 240/2 LC |
| 2,709,217 | 5/1955 | McCluskey | 240/2 LC |
| 3,054,291 | 9/1962 | Landwer | 73/293 |
| 3,696,675 | 10/1972 | Gilmour | 116/118 R |
| 3,832,901 | 9/1974 | Girvin | 116/118 R |

Primary Examiner—Stephen J. Tomsky
Attorney, Agent, or Firm—Merchant, Gould, Smith, Edell, Welter & Schmidt

[57] ABSTRACT

A transparent fuel tank for motorcycles and like vehicles, in which an illuminator provides light to the plastic wall, not only giving a clearer indication of the level of liquid in the tank, but also having decorative and safety advantages as well.

7 Claims, 4 Drawing Figures

ILLUMINATED GASOLINE TANK

BACKGROUND OF THE INVENTION

This invention relates to the general field of automotive engineering, and specifically to fuel tanks for vehicles such as motorcycles.

Although the fuel consumption of a motorcycle is small compared to that of an automobile, the space conveniently available for installation of such a tank in gravity-feed relation to the engine is also limited, and with it the volume of fluid which can be carried. It is therefore necessary that a rider of such a vehicle bear in mind that his fuel supply is not unlimited: various forms of indicators for continuously showing the level of fuel in motorcycle tanks have been developed. Such indicators cannot be as sophisticated as those in cars, for obvious reasons, and diffulty is often encountered because of the irregular shape taken by fuel tanks for motorcycles. A particularly desirable feature in an indicator of this sort is that it be readable at night in the absence of any significant level of artificial ambient illumination such as street lights, for example.

SUMMARY OF THE INVENTION

The present invention is a solution to the problems mentioned above. It comprises making the entire fuel container, of whatever shape is desired, out of strong, impact resistant, transparent plastic, so that in the daytime the level of fuel remaining is instantly evident by mere inspection, and configuring a portion of the container to receive and transmit light from a suitable incandescent lamp, on the principle of the "light pipe", to provide illumination by which the fuel level may also be evident on inspection at night.

Various advantages and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
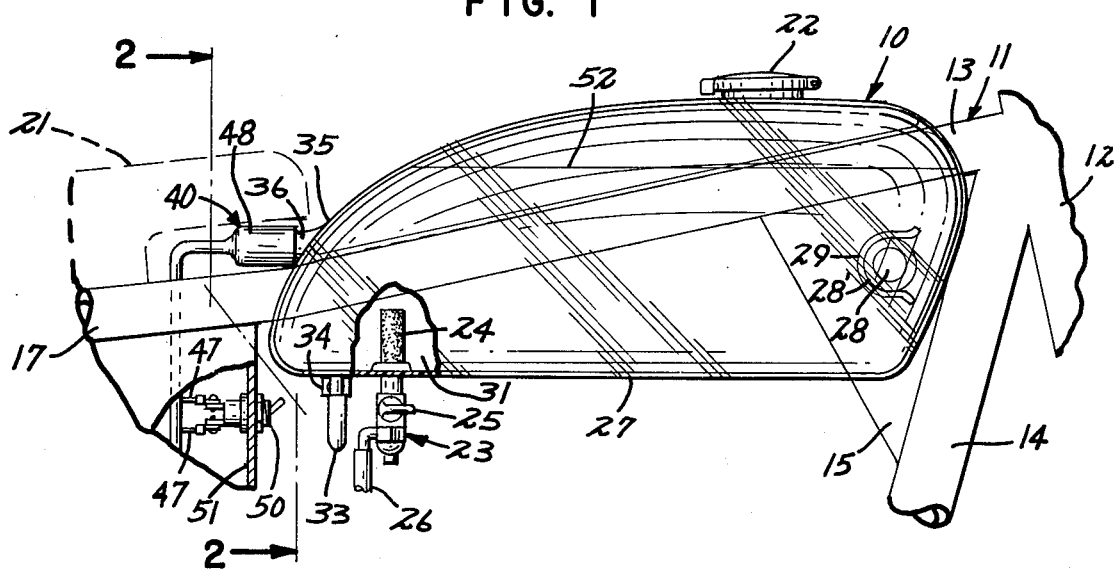
FIG. 1 is a fragmentary side view of a fuel container according to my invention installed on a motorcycle, parts being broken away for clarity of illustration.
Figure 2:
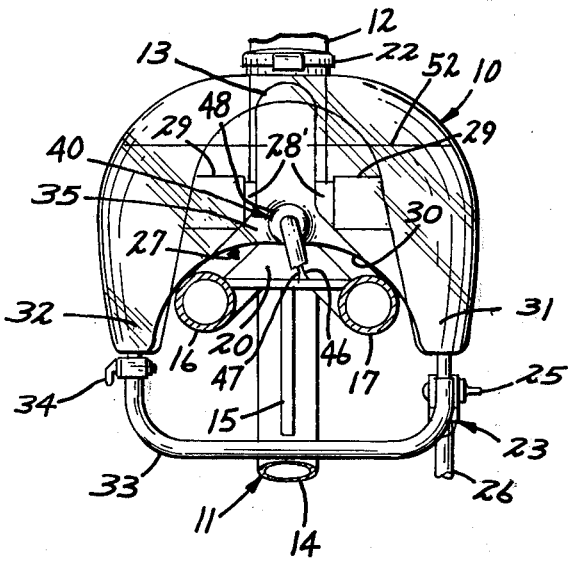
FIG. 2 is a transverse sectional view along the line 2—2 of FIG. 1.
Figure 4:
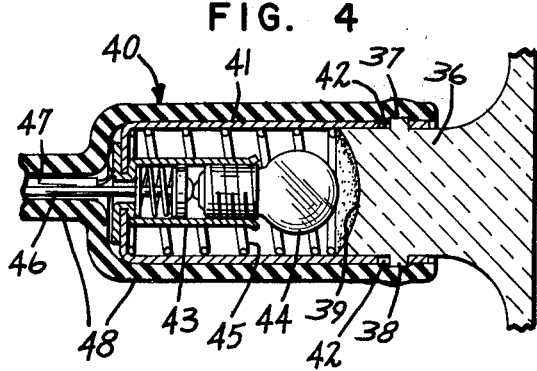
FIG. 4 is a longitudinal sectional view to a larger scale of an illuminator according to my invention, the section being along the line 4—4 of FIG. 3.
Figure 3:
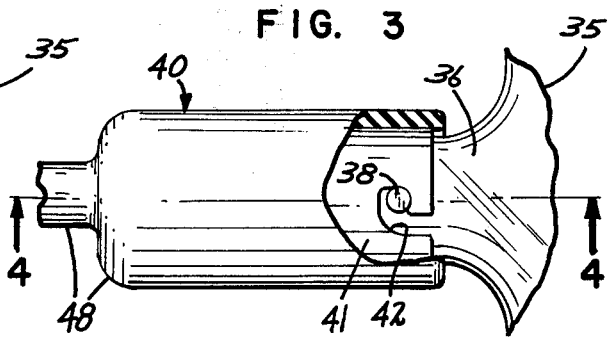
FIG. 3 shows a detail of a portion of FIG. 1.

As shown in the drawing, a fuel tank 10 according to my invention is mounted on the frame 11 of a motorcycle shown only in fragmentary form. Frame 11 is shown to comprise a head tube 12 for rotatably receiving the steering fork and front wheel, not shown, to which tube are welded or otherwise secured tubular frame members 13 and 14 braced by a gusset 15. As is common, member 13 branches rearwardly of gusset 15 and continues as a pair of tubes 16 and 17 braced by a gusset 20. The saddle of the vehicle is suggested at 21, and is carried on tubes 16 and 17 in any suitable fashion. Rearwardly, tubes 16 and 17 join other tubes, not shown, to complete a rigid frame upon which the engine, rear wheel, and drive train of the vehicle are mounted as is conventional. The frame is illustrated in FIG. 1 in the position it takes when the vehicle wheels rest on level ground.

Tank 10 has the general configuration of a saddle. It is made of a transparent, impact resistant, polyacrylate or polycarbonate resin such as LEXAN. A filler cap 22 is provided at the top of tank 11, and fuel outlet means 23 is provided at the bottom of the tank, including a filter 24, a shut-off valve 25, and a conduit 26 through which fuel may flow by gravity to the carburetor of the engine below. The bottom 27 of tank 10 is not flat, but is upwardly arched so that the tank can rest on and depend below frame members 13, 16 and 17. In one embodiment of the invention, a pair of pegs 28 carrying resilient bushings 28' projects laterally from gusset 15 and are received in horizontally extending grooves 29 in the bottom 27 of the tank. The rear end of the tank may be held down by saddle 21. At any location along the tank the bottom is at a higher level centrally than distally, the central arch 30 separating a pair of spaced pockets 31, 32. Outlet means 23 is located at the rear of pocket 31, and the pockets are interconnected by a crossover 33 having a shut-off valve 34 as is customary with saddle-type fuel tanks.

The rear wall 35, at a location near arch 30 of bottom 27, is formed as a rearwardly and outwardly projecting cylindrical boss 36, the axis of the cylinder being shown as parallel to the bottoms of pockets 31 and 32, and hence as horizontal on level ground. Boss 36 is formed to comprise, or has otherwise secured therein, a pair of bayonet pins 37, 38 to receive and hold an illuminator 40 presently to be described. The outer end 39 of boss 36 is spherically concave, to act as a negative lens, and its surface is treated to make it translucent and yet diffusive.

Illuminator 40 is shown to comprise a housing 41 having bayonet slots, one shown at 42, to receive pins 37, 38. A suitable socket 43 is secured in housing 41 to receive an incandescent lamp 44. When housing 41 is connected by the bayonet slots and pins to boss 36, the outer rim of the latter engages and compresses a spring 45 in housing 21 to resiliently maintain the physical connection. Lamp 44 is close to the surface 39 of boss 36, but spaced therefrom sufficiently to prevent heat damage. Electrical conductors 46, 47 make connection from the vehicle battery, not shown, to the shell and tip contacts of socket 43, and one of these conductors is connected through a switch 50 mounted on a suitable bracket 51 on the vehicle frame, operable to energize and deenergize lamp 44. Housing 41 and conductors 46, 47 may be enclosed in a suitable weather resistant sheathing 48.

It will be evident that when tank is substantially full of fuel, the location of boss 36 is well below the level of liquid, indicated in general terms at 52 in FIG. 1. In daylight the level of liquid will be clearly evident to the rider if he glances down at the tank, so that he may replenish his supply of fuel as necessary.

At night, when the rider wishes to know how his fuel supply is holding out, he operates switch 50, energizing lamp 44 from the vehicle battery. Boss 36 now acts as a light pipe, conducting light from lamp 44 around and into the fuel, so that its level can be readily determined.

As the level of fuel falls past that of boss 36, the illumination in the tank varies perceptibly as the fuel moves in the tank, and then becomes steady with a recognizably different appearance from that of a full tank, when the level remains below that of the boss.

The intensity of illumination produced by lamp 44 is sufficiently low that it does not interfere with the rider's forward vision or with his night adaptation. Lamp 44 may therefore be left on, adding a decorative touch to the appearance of the vehicle, and in some measure acting to make the vehicle more visible to others.

While the invention has been shown as applied in a particular fashion, it will be appreciated that fuel tanks of numerous configurations are mounted on motorcycles in various fashions. The invention here may be adapted to any of these uses, and I do not intend the particular installation shown to be limited, for example, to tanks of the saddle type.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matter of shape, size and arrangement of parts, within the principle of the invention, to the full extent indicated by the broad general meaning of the terms in which the appended claims are expressed.

What is claimed is:

1. A fuel tank for motorcycles and the like comprising, in combination:

a container of transparent material having front and rear ends, a filling opening at its top, and fuel outlet means at its bottom;

a boss of said material unitary with said container and extending outwardly therefrom near the bottom thereof; and means including an incandescent lamp supplying light to an outer surface of said boss for conduction in said material to provide illumination by which the level of fuel in said container may be observed during conditions of ambient darkness.

2. The structure of claim 1 in which said tank is of the general configuration of a saddle, with the bottom of the tank at a higher level centrally than distally in transverse section, and in which said boss extends from the rear of said container at a location near the higher level of said bottom.

3. The structure of claim 1 in which the last named means includes said lamp, means for electrically energizing said lamp, and means mounting said lamp on said boss in spaced apposition to the outer end thereof.

4. The structure of claim 3 in which said mounting means includes at least one bayonet slot and said boss includes at least one bayonet pin for engaging said slot.

5. The structure of claim 3 in which said outer end of said boss comprises a translucent light diffusing surface.

6. The structure of claim 3 in which said outer end of said boss in inwardly concave to constitute a negative lens.

7. The structure of claim 1 in which said container is integrally configured to fit and be retained in a predetermined mounting space.

\* \* \* \* \*